Patented May 6, 1947

2,420,238

UNITED STATES PATENT OFFICE 2,420,238

STABILIZED FAT COMPOSITIONS

Paul Gyorgy, Cleveland, Ohio, assignor to Wyeth Incorporated, Philadelphia, Pa., a corporation of Delaware No Drawing. Application June 7, 1944, Serial No. 539,187

8 Claims. (Cl. 99—163)

This invention relates to the stabilization of fat type compositions against deleterious oxidative changes and relates in particular to fat-type food compositions stabilized by the presence of a small amount of a synergistic antioxygenic combination composed of particular known organic antioxidants and a crude source of the vitamin B complex containing at least potentially an antioxygenic substance.

It is a well known fact that oils, fats, and foodstuffs containing unsaturated glycerides often become rancid, which in the case of edible products renders them unfit for human consumption. This difficulty is especially true in the case of oils and fats that have been subjected to refining or processing operations, or which are stored for an appreciable time before being used.

One object of the present invention is to hinder oxidative changes in liquid fat-type foodstuffs, such as milk, during processing to a more concentrated state.

Another object of the invention is to provide an antioxygenic synergic combination, part of the antioxygenic activity of which is supplied by a crude source of the vitamin B complex.

Another object of the invention is to furnish a practical method of stabilizing fat-type foodstuffs, particularly fats and oils containing unsaturated glycerides.

Another object of the invention is to provide a stabilized foodstuff without changing the normal appearance, taste, or flavor characteristics of the treated product.

I have found the above objectives are all accomplished by incorporating into fat-type compositions a small amount of a synergistic antioxygenic combination of one of the hereinafter specified organic antioxidants and a crude source of the vitamin B complex containing at least potentially an antioxygenic substance, which alone has relatively slight antioxygenic effect. As the organic antioxidant I employ a relatively nontoxic member of the group of reducing agents consisting of sulfhydryl compounds, phenylene diamine, diphenylamine and ether and/or acetate derivatives of hydroquinones such as monobenzyl ether of hydroquinone. As the crude source of the vitamin B complex I prefer to make use of an aqueous alcoholic rice bran concentrate or an extract of the concentrate prepared via either a chloroform extraction or a chromatographic procedure. One may, however, utilize with somewhat less advantage other crude sources of vitamin B complex, such as unpolished rice flour, brown rice, rice bran, oats, wheat, corn, oat flour, brewers' dried yeast, "top yeast," "bottom yeast," aqueous extracts of yeast, aqueous rice bran extracts, aqueous extracts of liver, milk sugar residues, and molasses of the black strap, beet, or sorghum variety.

As a sulfhydryl compound, I have found thiourea especially useful with a crude source of the vitamin B complex in furnishing a synergistic antioxygenic combination for stabilizing fat-type compositions. Typical other sulfhydryl compounds that may be used, however, are thiouracil, N-acetyl thiourea, and cysteine. In the case of the sulfhydryl compounds, it is desirable to have several percent of water present in the fat-type food composition to secure the maximum synergistic antioxygenic effect. I have found p-aminobenzoic acid, which is one of the substances present in some crude sources of the vitamin B complex to be particularly synergistically effective with thiourea in stabilizing fat-type compositions.

The following Table I serves to illustrate specifically the synergistic antioxygenic activity of combinations consisting of a crude source of the vitamin B complex, such as rice bran concentrate with phenylene diamine, diphenylamine, hydroquinone monomethyl ether, or thiourea. In determining the data set forth in the table, a modified dried system was used composed of 18 gms. of corn starch, 3.5 gms. of redistilled linoleic acid, and varying percentages of antioxidants as indicated. The various ingredients were thoroughly mixed and incubated at 30° C. Representative aliquot samples were taken at the intervals indicated in Table I and the fat extracted with chloroform and the iodine number determined. For all practical purposes the iodine number of the linoleic acid in this system never falls below about 50 so that in general, measurements were no longer taken when values of about 50 were reached. It will be noted that in the case of both the control, wherein no antioxidant was added, and the 2.5% rice bran concentrate alone, an iodine value of about 50 is reached in 7 days.

TABLE I

| Antioxidant Mixture | Conc., per cent | Iodine number | | | | |
|---|---|---|---|---|---|---|
| | | 7 days | 9 days | 13 days | 20 days | 27 days |
| Control (no antioxidant) | | 50.4 | | | | |
| Rice bran concentrate | 2.5 | 58.2 | | | | |
| | 4.8 | | 68.8 | 68.8 | | |
| | 5.0 | 136.0 | | | | |
| Phenylene diamine | .03 | 136.2 | 45.5 | 45.5 | | |
| Rice bran Concentrate | 2.5 | | | | | |
| plus Phenylene diamine | .03 | 128.0 | 141.9 | 141.9 | 61.3 | |
| Rice Bran Concentrate | 5.0 | | | | | |
| plus Phenylene diamine | .03 | 151.4 | 149.0 | 149.0 | 134.7 | 71.5 |
| Hydroquinone Monomethyl Ether | .03 | 147.0 | 137.3 | 137.3 | 56.2 | |
| Rice Bran Concentrate | 2.5 | | | | | |
| plus Hydroquinone Monomethyl Ether | .03 | 134.6 | 132.9 | 132.9 | 130.6 | 142.9 |
| Rice Bran Concentrate | 5.0 | | | | | |
| plus Hydroquinone Monomethyl ether | .03 | 152.3 | 146.4 | | 136.3 | 54.7 |
| Diphenylamine | .015 | | 53.6 | | | |
| Rice Bran Concentrate | 4.8 | | | | | |
| plus Diphenylamine | .015 | | 124.3 | | | |
| Thiourea | .05 | | 52.5 | | | |
| Rice Bran Concentrate | 4.8 | | | | | |
| plus Thiourea | .05 | | 130.2 | | | |

Small amounts, preferably about 2 to 10% or slightly more of the synergistic antioxygenic combinations may be added to various foodstuffs containing a significant amount of fat to attain a definite retardation of oxidative deterioration. Thus small amounts of the combinations may be added to milk before converting the same to an almost dry state by means of spray drying or other suitable evaporative procedures. Or the combinations may be incorporated in small amounts for protective purposes in dry milks, such as skim milk powder containing milk compounds with or without added other fats. They may likewise be employed to hinder the development of rancidity in mixed fat compositions, such as one containing beef fats, cocoanut oil, cod liver oil, and partially hydrogenated soybean oil or one containing tallow, oleo oil, and soya bean oil. Butter and lard may thus be protected as well as various oils, such as cottonseed, castor, sesame, peanut, olive, teaseed, palm, cocoanut, corn, soya bean, shark, cod liver, halibut liver, mackerel, etc. Other fat containing foods to which the invention is applicable are fatty meats, such as bacon, fatty emulsions in water, such as milk, cream, ice cream, mayonnaise, nuts, coffee, etc. In stabilizing fatty type compositions with my synergistic antioxygenic combinations, I prefer for best results to use the specified organic antioxidants within definite limits, thus in the case of phenylene diamine and hydroquinone monomethyl ether I prefer to have present about .02 to .3%, in the case of diphenylamine about .01 to .15% and in the case of thiourea about .03 to .5%.

Obviously, the odorless types of the antioxygenic combinations may be applied advantageously to the stabilization of essential oils, such as oils of lemon, orange, peppermint, wintergreen, cloves, sassafras, etc., and cream of the vanishing, cold, shaving, and depilatory types.

As shown in the following Table II, I have further found that p-aminobenzoic acid forms a synergistic antioxygenic combination not only with sulfhydryl compound, such as thiourea, but also with sulfonamide compounds, such as sulfanilamide and sulfaguanidine.

TABLE II

*Antioxidant activity of sulfonamide drugs and p-aminobenzoic acid*

| Supplement to Basic Diet | Butter yellow per gm. diet | | | Iodine No. (21st day) |
|---|---|---|---|---|
| | 5th day | 8th day | 21st day | |
| | *Mg.* | *Mg.* | *Mg.* | |
| 0.5 gm. sulfaguanidine | 0.11 | 0.10 | 0.11 | 68.2 |
| 0.5 gm. sulfaguanidine+20 mg. p-aminobenzoic acid | 0.39 | 0.33 | 0.32 | 124.1 |
| 0.5 gm. sulfanilamide | 0.17 | 0.15 | 0.15 | 69.4 |
| 0.5 gm. sulfanilamide+20 mg. p-aminobenzoic acid | 0.45 | 0.41 | 0.37 | 126.0 |
| 20 mg. p-aminobenzoic acid | 0.30 | 0.18 | 0.08 | 64.2 |
| Control | 0.10 | 0.06 | 0.05 | 60.0 |

Such combinations can likewise be used to stabilize fat-type compositions.

Since many apparently widely different embodiments of this invention may be made without departing from the spirit and scope thereof, it is to be understood that I do not limit myself to the above description except as defined in the appended claims.

I claim:

1. A stabilized composition of matter comprising a substance containing a significant percentage of fats susceptible to oxidation, and a small effective amount of a mixture of monobenzyl ether of hydroquinone and a crude source of the vitamin B complex.

2. A stabilized composition of matter comprising a substance containing a significant percentage of fats susceptible to oxidation, and a small, effective amount of a mixture of a crude source of vitamin B complex and a monoether of hydroquinone selected from the group consisting of monomethyl and monobenzyl ethers.

3. A composition of matter comprising an oleaginous material in which is included a small effective amount of a mixture of a crude source of vitamin B complex and a monoether of hydroquinone selected from the group consisting of monomethyl and monobenzyl ethers, said combination producing a synergistic action inhibiting oxidation and the development of rancidity in the oleaginous matter.

4. A stabilized composition of matter comprising milk solids, a fat susceptible to oxidation, and a small, effective amount of a mixture of a crude source of vitamin B complex and a monoether of hydroquinone selected from the group consisting of monomethyl and monobenzyl ethers.

5. A stabilized composition of matter comprising dried milk and a small, effective amount of a mixture of a crude source of vitamin B complex and a monoether of hydroquinone selected from the group consisting of monomethyl and monobenzyl ethers.

6. A stabilized composition of matter comprising a substance containing a significant percentage of fats susceptible to oxidation, and a small, effective amount of a mixture of monomethyl ether of hydroquinone and a crude source of the vitamin B complex.

7. A stabilized composition of matter comprising a substance containing a significant percentage of fats susceptible to oxidation, and a small, effective amount of a mixture of monomethyl ether of hydroquinone and rice bran concentrate.

8. A stabilized composition of matter comprising tallow, oleo oil, soya bean oil, and a small, effective amount of a mixture of a crude source of vitamin B complex and a monoether of hydroquinone selected from the group consisting of monomethyl and monobenzyl ethers.

PAUL GYORGY.

REFERENCES CITED

The following references are of record in the file of this patent:

UNITED STATES PATENTS

| Number | Name | Date |
|---|---|---|
| 2,188,319 | Siemers | Jan. 30, 1940 |
| 2,282,788 | Musher | May 12, 1942 |
| 2,138,924 | Jones | Dec. 6, 1938 |

OTHER REFERENCES

Science, Dec. 10, 1943, vol. 98, pages 518–20.